United States Patent
Verellen et al.

(10) Patent No.: US 10,641,211 B2
(45) Date of Patent: May 5, 2020

(54) TESTING METHOD

(71) Applicant: SAFRAN AIRCRAFT ENGINES, Paris (FR)

(72) Inventors: Alexis Verellen, Saint-Leu-la-Foret (FR); Serge Le Gonidec, Vernon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 393 days.

(21) Appl. No.: 15/534,659

(22) PCT Filed: Dec. 4, 2015

(86) PCT No.: PCT/FR2015/053321
§ 371 (c)(1),
(2) Date: Jun. 9, 2017

(87) PCT Pub. No.: WO2016/092183
PCT Pub. Date: Jun. 16, 2016

(65) Prior Publication Data
US 2018/0135561 A1    May 17, 2018

(30) Foreign Application Priority Data
Dec. 12, 2014  (FR) ..................... 14 62368

(51) Int. Cl.
*F02K 9/96* (2006.01)

(52) U.S. Cl.
CPC ............ *F02K 9/96* (2013.01); *F05D 2260/83* (2013.01)

(58) Field of Classification Search
CPC ....................................................... F02K 9/96
See application file for complete search history.

(56) References Cited

U.S. PATENT DOCUMENTS

| | | | | |
|---|---|---|---|---|
| 6,023,680 A | * | 2/2000 | Wooster | G06Q 10/06316 705/7.26 |
| 2008/0154392 A1 | * | 6/2008 | Maenishi | H05K 13/0853 700/32 |

FOREIGN PATENT DOCUMENTS

| FR | 2946746 A1 | 12/2010 |
|---|---|---|
| RU | 2393450 C1 | 6/2010 |

OTHER PUBLICATIONS

International Search Report issued in corresponding International Application No. PCT/FR2015/053321, dated Mar. 4, 2016 (4 pages—including English language translation).

* cited by examiner

*Primary Examiner* — Manuel A Rivera Vargas
(74) *Attorney, Agent, or Firm* — Bookoff McAndrews, PLLC

(57) ABSTRACT

The invention relates to the field of technical testing, and more particularly to a method of testing a machine, the method comprising: at least one step (S101) of determining a plurality of operating points for said machine, each operating point being defined by a duration and a specific value of at least one operating parameter of the machine; a step of calculating a set of distances between pairs of operating points; a step (S106) of selecting an optimum sequence of operating points by applying an algorithm for solving the traveling salesman problem to said set of distances between pairs of operating points; and a step (S107) of controlling the operation of said machine according to said optimum sequence of operating points.

10 Claims, 2 Drawing Sheets

TESTING METHOD

CROSS-REFERENCE TO RELATED APPLICATIONS

This application is the U.S. national phase entry under 35 U.S.C. § 371 of International Application No. PCT/FR2015/053321, filed on Dec. 4, 2015, which claims priority to French Patent Application No. 1462368, filed on Dec. 12, 2014, the entireties of which are herein incorporated by reference.

FIELD OF THE INVENTION

The present invention relates to the field of technical testing, and more particularly to a method of testing a machine.

BACKGROUND

Typically, when testing a machine, the operation of the machine is controlled to apply a predetermined sequence of operating points so as to enable the operation of the machine to be evaluated at each of the operating points. Each operating point is defined by a duration and by a set of operating parameters of the machine. Such a test method, when applied to a liquid-propellant rocket-engine, is disclosed in Russian patent RU 2 393 450.

Such tests can be very expensive, in particular when they are applied to a machine of great technical complexity, such as for example a liquid-propellant rocket-engine. If the test needs to be interrupted before reaching all of the operating points that it is desired to evaluate, e.g. as a result of a malfunction of the machine under test, or as a result of exhausting resources such as the propellants when testing a rocket-engine, it is necessary to perform new tests that are expensive in terms of time and resources, until the entire set of operating points has been tested.

In French patent application FR 2 946 746 A1, there is proposed a test method that comprises the following steps:

determining a plurality of operating points of a machine for testing, each operating point being defined by a minimum duration and a specific value for at least one operating parameter of the machine;

calculating a set of distances between pairs of operating points;

selecting an optimum sequence of operating points by applying an algorithm for solving the traveling salesman problem to said set of distances between pairs of operating points; and controlling the operation of said machine according to said optimum sequence of operating points.

Nevertheless, that prior art method does not make it possible to take account of any possible change in circumstances during the test, such as for example the real consumption of certain finite resources, e.g. a fuel or a propellant, or changes of priority or of risk for the remaining operating points. It can be desirable to rearranged the optimum sequence while the test is running, e.g. in order to take account of the real consumption by the machine and the operating points that have already been reached, to take account of certain finite resources, such as for example a fuel or a propellant, and/or in order to take account of changes relating to the importance or the risk of various operating points during testing.

SUMMARY

The present invention seeks to remedy those drawbacks. The invention seeks to propose a method of testing a machine that makes it possible to rearrange the optimum sequence while the test is being executed, e.g. in order to take account of the real consumption of certain finite resources by the machine at the operating points that have already been reached, such as for example consumption of a fuel or propellant, and/or in order to take account of changes relating to the importance or the risk of various operating points during testing, in order to maximize the number and the importance of the operating points that are reached by the end of the test.

This object is achieved by the fact that, after the machine has reached at least one operating point, the method further comprises at least the following additional steps:

modifying coefficients for increasing and/or decreasing said distances;

calculating said set of distances once more with the modified coefficients; and updating said optimum sequence by applying said algorithm for solving the traveling salesman problem to said set of distances after they have been recalculated.

By means of these provisions, and in particular by modifying coefficients for increasing and/or decreasing distances between pairs of operating points while the test is running, it is possible to further optimize each test.

Thus, by way of example, after all of the operating points of maximum priority have been reached, it is possible to neutralize a priority coefficient for each of the remaining operating points so that account is no longer taken of the priority of the remaining operating points when subsequently updating the optimum sequence. After all of the operating points with a minimum risk have been reached, it is also possible to neutralize a risk coefficient for each of the remaining operating points so that account is no longer taken of the risk of the remaining operating points when subsequently updating the optimum sequence.

The machine may be a heat engine, and in particular it may comprise one or more turbomachines. In particular, the machine may be a liquid-propellant rocket-engine. In this field, tests are particularly expensive and they are subject to large constraints in terms of time and other resources, such as the quantities of propellants that are available. In addition, there can also be a particularly high risk that such a liquid-propellant rocket-engine might fail during certain operating points, thereby leading to a premature interruption of the test. Consequently, the advantages of the invention are particularly marked in its application to such a machine. Nevertheless, it is also applicable to the other types of machine.

When the machine for testing is a liquid-propellant rocket-engine, each operating point may be characterized by specific values for at least one pressure in the combustion chamber and for a ratio between propellant flow rates. Nevertheless, other operating parameters may also be used as an alternative or in addition to the above, such as for example the pressures of the propellants at the inlet of feed pumps.

A distance from one operating point in a pair of operating points to the other operating point in the pair may be calculated in particular by estimating a time lapse for passing from said one operating point in the pair to the other operating point in the pair. Thus, the optimum sequence selected using the algorithm for solving the traveling salesman problem makes it possible to minimize the time needed to reach all of the operating points and/or to maximize the number of operating points that are reached in a limited lapse of time. In addition, selecting the optimum sequence may also take account of the time lapses for passing between the operating points of a pair being different in one direction and in the other. Nevertheless, the distance between operating points may also be based on other criteria: for example, in addition or as an alternative to estimating the time elapse, it is possible to estimate the quantity of propellant to be consumed for passing from one operating point of the pair to the other operating point of the pair.

In certain circumstances, it may be desirable or necessary to cause at least two operating points to follow each other in a predetermined subsequence during the test. In order to force this succession in the optimum sequence as selected using the algorithm for solving the traveling salesman problem, the distances from a designated preceding operating point to all of the other operating points with the exception of a designated following operating point, may be increased so as to force a direct succession from the designated preceding operating point to the designated following operating point referred.

In addition, certain operating points may have greater priority than others. In order to take this priority into account when selecting the optimum sequence, at least one distance from a first operating point to a second operating point may be decreased or increased using a priority coefficient associated with said second operating point. It is thus possible to decrease distances in order to reach the higher priority operating points from all of the other operating points, thereby making it easier to ensure that the highest priority operating points are arranged at the beginning of the optimum sequence.

Furthermore, other operating points may present a particularly high risk of prematurely interrupting the test. In order to take account of this risk when selecting the optimum sequence, a distance from a first operating point to a second operating point may be increased or decreased using a risk coefficient associated with said second operating point. It is thus possible to increase the distances for reaching the highest risk operating point from all of the other operating points, thereby making it easier to ensure that the riskiest operating points are arranged at the tail end of the optimum sequence.

Algorithms for solving the traveling salesman problem are normally adapted to give a solution in the form of a circuit, with the final point in the sequence being close to the starting point. Nevertheless, in this application, it may be undesirable to obtain a sequence in the form of a circuit. In order to avoid that, it is possible to increase all of the distances from a starting operating point to all of the other operating points. By causing the starting operating point to be identically, or nearly identically, distant from all of the other operating points, it is possible to minimize any tendency of algorithms for solving the traveling salesman problem to select an optimum sequence in the form of a circuit with a final operating point close to the starting operating point.

The test method of this disclosure may be performed in particular on a numerically controlled test bench. Consequently, the invention also provides a computer program comprising a set of instructions for performing the above-mentioned test method, and also a computer device programmed to perform the test method, and indeed a data medium comprising instructions that are executable by a computer device to perform the test method. In the present context, the term "data medium" should be understood as any device for storing data that can be read by a computer device. In particular, such a data medium may be a magnetic data storage device, such as a disk or a magnetic tape, an optical data storage device, such as an optical disk, or an electronic data storage device, such as a volatile or non-volatile electronic memory.

BRIEF DESCRIPTION OF THE DRAWINGS

The invention can be well understood and its advantages appear better on reading the following detailed description of implementations given as non-limiting examples. The description refers to the accompanying drawings, in which.

DETAILED DESCRIPTION

Figure 1:
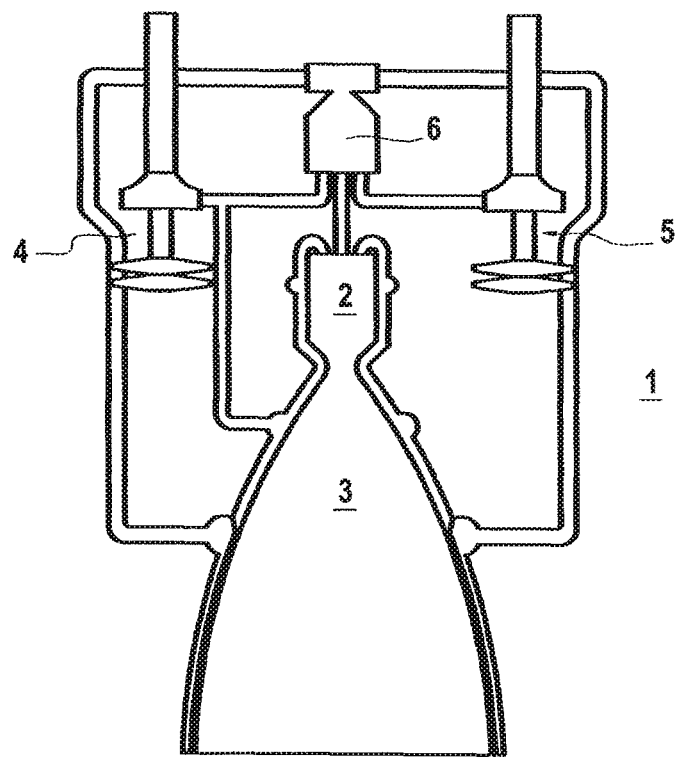
FIG. 1 is a diagrammatic view of a liquid-propellant rocket-engine.

FIG. 1 is a diagrammatic view of a liquid-propellant rocket-engine 1. The rocket-engine 1 has a combustion chamber 2 extended by a convergent-divergent nozzle 3, together with a first turbopump 4, a second turbopump 5, and a gas generator 6 for feeding the combustion chamber 2 with propellant from corresponding tanks (not shown). Each of the turbopumps comprises at least a pump and a turbine connected together by a common rotary shaft, so that the pump can be driven by the turbine via the rotary shaft.

In operation, a first liquid propellant, which may for example be a cryogenic propellant such as liquid hydrogen, is pumped by the first turbopump 4 to the combustion chamber 2 and to the gas generator 6. A second propellant, which may also be a cryogenic propellant, such as liquid oxygen, is pumped by the second turbopump 5, likewise to the combustion chamber 2 and to the gas generator. In the combustion chamber 2, an exothermic chemical reaction between the two propellants generates combustion gas at high temperature, which is then accelerated to supersonic speed by expanding in the nozzle 3, so as to generate thrust in the opposite direction by reaction. As shown, the walls of the nozzle 3 may be cooled by the propellants before they are injected into the combustion chamber 2. Furthermore, the fraction of the propellants feeding the gas generator 6 reacts therein in exothermic manner in order to generate high-temperature combustion gas, which, on expanding through the two turbines 4 and 5, serves to drive them.

It is also possible to envisage rocket-engines having other configurations. Thus, by way of example, in so-called "expander" cycle rocket-engines, the turbopumps are not driven by combustion gas coming from a gas generator, but by at least one of the propellants after it has been heated by heat generated in the combustion chamber. The present invention is equally applicable in these alternative configurations and also to testing other types of machines, and in particular heat engines and turbomachines.

Figure 2:
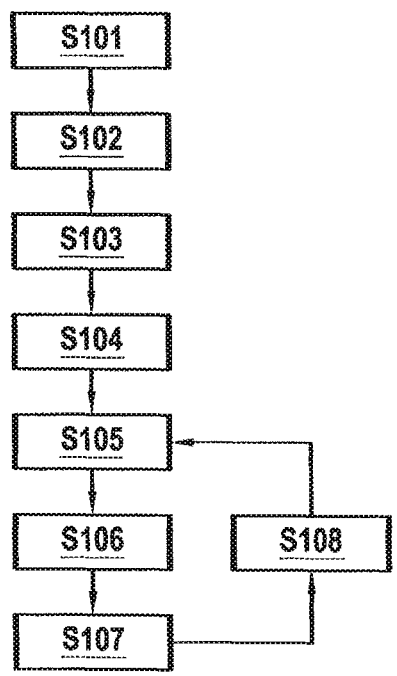
FIG. 2 is a diagram of the steps of a test of a test method in an implementation.

FIG. 2 is a diagram showing the steps of an implementation of a method for testing such a rocket-engine. In an initialization step S101, a set of operating points is determined for the rocket-engine that is to be tested. Each operating point may be characterized by a minimum duration and by a set of operating parameters, such as for example a pressure in the combustion chamber and a ratio between the flow rate (by mass or by volume) of the first propellant at the inlet to the first turbopump 4, and a flow rate (by mass or by volume) of the second propellant at the inlet to the second turbopump 5. Alternatively, or in addition to the above operating parameters, it is possible to use other operating parameters, and in particular those that are known as "interface" conditions, i.e. the pressure of the first propellant at the inlet to the first turbopump 4 and the pressure of the second propellant at the inlet to the second turbopump.

In the following step S102, a first set of distances between operating points is determined. In this first set, each distance c(A,B) from a first operating point A to a second operating point B in this first set may be defined as corresponding to the time needed to cause the rocket-engine to go from operating point A to operating point B. Instead of being expressed as a time, this distance may be expressed as a volume and/or a mass of propellant consumed during the transition, or indeed as a function of at least one item selected from time and the quantity of propellant. It should be observed that these distances are not necessarily symmetrical, i.e. the distance c(A,B) may be different from the distance of c(B,A), since it may be more or less difficult to go from operating point A to operating point B than vice versa. This set of distances may be expressed in the form of a square matrix.

Thereafter, in the following step S103, the distances from the starting operating point to all of the other operating points are increased. Ideally, these distances should be made infinite, however because of the limited digital resources available, it may be necessary to be satisfied with increasing these distances merely by several orders of magnitude. The purpose of this increase is to ensure that during subsequent application of an algorithm for solving the traveling salesman problem, no sequence of operating points is calculated that necessarily terminates in the proximity of the starting operating point. Specifically, algorithms for solving the traveling salesman problem normally give rise to a solution in the form of a circuit, with a finishing point that is close to the starting point. Since such a solution is not necessarily adapted to the present problem, the starting point is thus artificially moved far away from all of the other operating points, in order to avoid them.

Increasing the distances may also serve to force certain points to be followed by others in the sequence that results from subsequent application of the algorithm for solving the traveling salesman problem. Thus, in the following step S104, when two operating points are specified as necessarily following each other in the test, the distances from the designated preceding operating point to all of the other operating points other than the designated following operating point are increased so as to force a direct succession in the sequence that is to be calculated by the algorithm for solving the traveling salesman problem, going from the designated preceding operating point to the designated following operating point. Naturally, this may be done for more than two operating points. Ideally, these increased distances could likewise be made infinite, however because of limited available digital resources, it is likewise possible to be satisfied by increasing these distances merely by several orders of magnitude.

In the following step S105, a priority coefficient $k_p$ and a priority coefficient $k_r$ are applied to the distances c(A,B) of this first set of distances, in order to obtain a second set of distances c'(A,B) in application of the formula c'(A,B)=c(A,B)·$k_p$·$k_r$. This second set of distances may also be expressed in the form of a square matrix, like the first set.

The priority coefficient $k_p$ applied to each distance c(A,B) from a first operating point A to a second operating point B depends on a priority previously given to the second operating point B. More precisely, the priority coefficient $k_p$ decreases with increasing priority of the second operating point B. Thus, all of the distances to higher priority operating points can be decreased, while all of the distances to lower priority operating points can be increased, so as to give precedence to passing via higher priority operating points when solving the traveling salesman problem. For example, with three levels of priority, the priority coefficient $k_p$ applied to the distances to the operating points having the highest priority may receive a value of 0.8, while the coefficient applied to the distances to the operating points having the lowest priority may receive a value of 1.2, while the distances to the operating points of intermediate priority receive a neutral value of 1. Nevertheless, other values, or indeed some other number of priority levels could be applied, depending on circumstances.

The risk coefficient $k_r$ applied to each distance c(A,B) from a first operating point A to a second operating point B depends on a level of risk associated with the second operating point B. More precisely, at least initially, the risk coefficient increases with an increasing level of risk associated with the second operating point. Thus, all of the distances to the higher risk operating points may initially be increased so as to give preference to, or indeed force passage initially via the lower risk operating points. Nevertheless, as explained below, the values of the risk coefficient $k_r$ may vary while carrying out the test.

In the following step S106, an algorithm for solving the traveling salesman problem, such as for example the Lin-Kernighan heuristic algorithm (LKH algorithm) is applied to the second set of distances c'(A,B) so as to select an optimum sequence of operating points that begins to be applied in step S107, in which the test is executed by causing the rocket-engine 1 to operate initially by going via at least the initial operating points in the optimum sequence.

Figure 3:
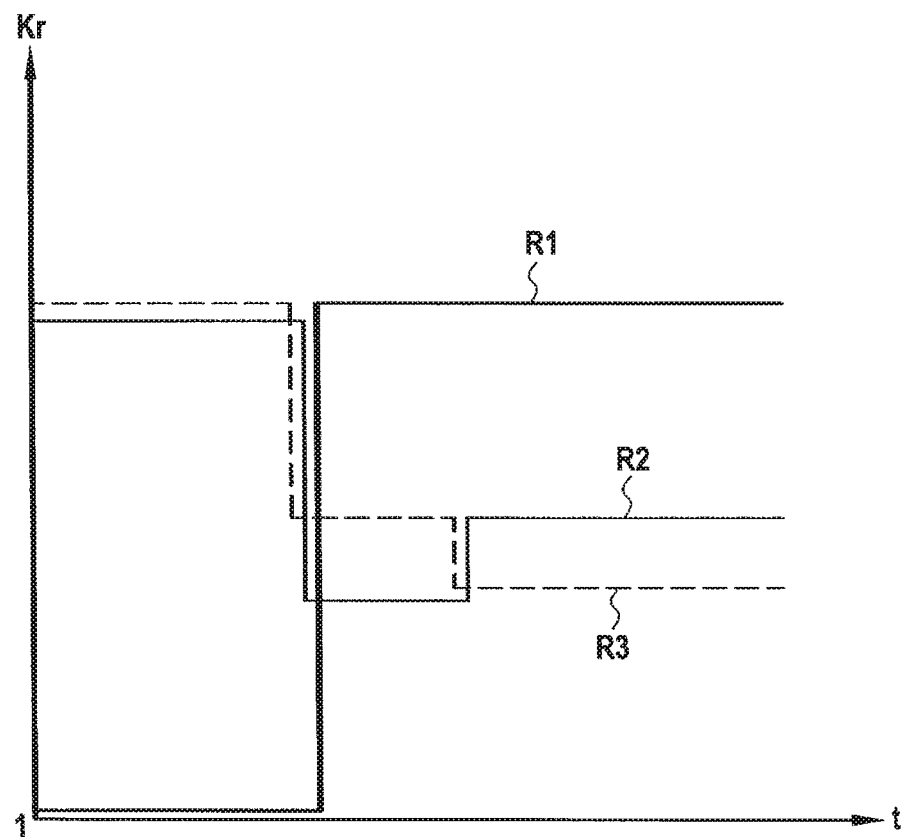
FIG. 3 is a graph showing how risk coefficients vary while executing the test in an implementation of the invention.

While the test is being executed, it is nevertheless possible to proceed with one or more updates to the optimum sequence, in particular by updating the data concerning operating points that have already been covered, and the resources consumed at those operating points, in particular in terms of time and/or quantities of propellants. In addition, as briefly mentioned above, it is possible in step S108 to modify the values of the risk coefficient $k_r$ during the test. An example of such a variation for the risk coefficient $k_r$ as a function of time t is shown in FIG. 3. In this example, three risk levels R1, R2, and R3 are given to the various operating points. Initially, the risk coefficient $k_r$ applied to the distances to the operating points having the lowest risk level, R1, is given a neutral value of 1, while the risk coefficients applied to the distances going to operating points with higher risk levels R2 and R3 are given values that are very high so as to force the algorithm for solving the traveling salesman problem to begin the optimum sequence by using the operating points of lowest risk. When approaching the end of the test, the value of the risk coefficient $k_r$ applied to the distances to the operating points with the lowest level of risk, R1, may be significantly increased so as to block low risk operating points that have not yet been reached, while the values of the coefficients applied to the distances to operating points with higher risk levels R2 and R3 are decreased, so as to enable them to be selected. Initially, the value of the risk coefficient $k_r$ applied to the distances to the points of intermediate risk, i.e. risk level R2, may be decreased more than the distances to the operating points having the highest level of risk R3, so as to give preference to passing via the former rather than the latter. Towards the end of the test, this relationship can be inverted once more, so as to give precedence more to passing via the operating points having the greatest risk.

After updating this data, steps S105 and S106 are repeated in order to recalculate the second set of distances c'(A,B) with the updated data together with the optimum sequence with this second set of distances, and the test is continued with step S107.

This test method may be performed by means of a numerically controlled test bench. Such a test bench may have a control unit suitable for being connected to the machine under test in order to control its operation. The control unit may also be programmed to select the optimum sequence prior to testing and/or to update it during testing, as a function of data updated using measurements taken by sensors incorporated in or connected to said test bench.

Although the present invention is described with reference to specific implementations, it is clear that various modifications and changes may be made to these implementations without going beyond the general ambit of the invention as defined by the claims. In addition, individual characteristics of the various implementations described may be combined in additional implementations. Consequently, the description and the drawings should be considered in a sense that is illustrative rather than restrictive.

We claim:

1. A method of testing a machine, the method comprising the following steps:
    determining a plurality of operating points for the machine, each operating point being defined by a minimum duration and a specific value of at least one operating parameter of the machine;
    calculating a set of distances between pairs of operating points;
    selecting an optimum sequence of operating points by applying an algorithm for solving a traveling salesman problem to the set of distances between pairs of operating points, wherein the optimum sequence is a sequence corresponding to a shortest route through the operating points; and
    controlling the operation of said machine according to said optimum sequence of operating points;
    wherein, after the machine has reached at least one operating point, the method further comprises at least the following additional steps:
    modifying coefficients for increasing and/or decreasing said distances;
    calculating the set of distances once more with the modified coefficients; and
    updating the optimum sequence by applying the algorithm for solving the traveling salesman problem to said set of distances after they have been recalculated.

2. The method according to claim 1, wherein the machine is a liquid-propellant rocket-engine.

3. The method according to claim 2, wherein each operating point is characterized by specific values for at least one pressure in the combustion chamber and for a ratio between propellant flow rates.

4. The method according to claim 1, wherein a distance from one operating point in a pair of operating points to the other operating point in the pair of operating points is calculated by estimating a time lapse for passing from the one operating point in the pair of operating points to the other operating point in the pair of operating points.

5. The method according to claim 1, wherein the distances from a designated preceding operating point to all other operating points with the exception of a designated following operating point are increased so as to force a direct succession in the optimum sequence from the designated preceding operating point to the designated following operating point.

6. The method according to claim 1, wherein a distance from a first operating point to a second operating point is decreased or increased using a priority coefficient associated with the second operating point.

7. The method according to claim 1, wherein a distance from a first operating point to a second operating point is increased or decreased using a risk coefficient associated with the second operating point.

8. The method according to claim 1, wherein all distances from a starting operating point to all other operating points are increased.

9. A computer program comprising a set of instructions for performing the method according to claim 1.

10. A data medium suitable for being read by a computer device and comprising instructions executable by the computer device after reading the data medium in order to perform the method according to claim 1.

* * * * *